United States Patent Office 3,062,797
Patented Nov. 6, 1962

3,062,797
POLYMERIZATION PROCESS OF POLAR VINYL MONOMERS WITH VANADYL DIKETONES AS CATALYSTS
Mark J. Stanek, Summit, N.J., assignor to Union Carbide Corporation, a corporation of New York
No Drawing. Filed Mar. 7, 1960, Ser. No. 12,933
10 Claims. (Cl. 260—89.1)

This invention relates to a novel catalyst composition and to its use in the polymerization of polar vinyl monomers to form normally solid polymers free from corrosive catalyst residues.

The polymerization of polar vinyl compounds, particularly the acrylates, methacrylates, acrylonitrile and the like, has heretofore been initiated either by thermal action or by the use of a free radical generating catalyst. Generally, temperatures in excess of 80 to 100° C. are required and considerable difficulty is experienced in controlling the reaction. For this reason, bulk polymerization methods have heretofore been avoided as a rule, in favor of suspension methods which are, however, relatively expensive. The added expense reflected in the market price of the polymer product has been a major factor tending to limit wide scale commercial use of these otherwise highly desirable polymers.

It is therefore a general object of the present invention to provide a process for the polymerization of polar vinyl monomers by bulk techniques which avoid the disadvantages of the prior art.

It is more particularly an object to provide a bulk polymerization process for acrylates, methacrylates, acrylonitriles and the like which is readily controlled to yield polymers having good physical properties.

These and other objects which will be apparent from the specification and claims are accomplished according to the process of the present invention in which a polymerizable polar vinyl monomer is contacted with a catalyst composition comprising a metal derivative of 1,3-diketones having the general formula

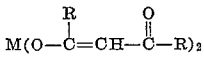

wherein M is a vanadyl [(V=O)++] radical and R is a hydrocarbon radical having up to about 8 carbon atoms and an organo aluminum compound.

The polymerizable monomers which can be suitably employed in the process of this invention to form normally solid homopolymers and copolymers are those which contain the characterizing unsaturated group

and which have an appreciable dipole moment. Those vinyl monomers which have a dipole moment at least as great as styrene, i.e., of about 0.13 Debye units, are hereinafter denoted as polar vinyl compounds and are to be construed as being within the scope of the invention. The term "polar vinyl compound" thus is intended to include any polymerizable monomer having a dipole moment from about 0.13 to 10.0 Debye units, and containing the

group. Thus, as employed herein, the term "polar vinyl monomer" does not include those monomers which do not possess any appreciable dipole moment such as ethylene, propylene, butylene, i.e., the olefins represented by the formula $C_nH_{2n}$ which are nonpolar in nature.

Illustrative of some of the polar vinyl compounds employed in the present process are vinyl esters of organic aliphatic and aromatic acids, preferably monobasic acids, for example those compounds having the general formula

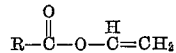

in which

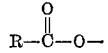

is the residue of a monobasic organic acid, such as vinyl acetate, vinyl propionate, vinyl butyrate, vinyl benzoate, vinyl chloroacetate, vinyl valerate, vinyl methoxyacetate, vinyl trimethylacetate, vinyl caproate, vinyl laurate, vinyl palmitate, vinyl linoleate, vinyl ethyl oxalate, vinyl ethyl maleate, vinyl hexahydrobenzoate, and vinyl tetrachlorobenzoate; vinyl halides such as vinyl fluoride, vinyl chloride, and vinyl bromide; vinyl aromatic compounds such as styrene, dichlorostyrene, methyl styrene, vinyl naphthalene and the like; vinyl substituted heterocyclic compounds, for instance vinyl pyridine; acrylic compounds such as those having the general formula

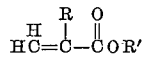

wherein R and R' are hydrogen or an alkyl group, preferably a lower alkyl group containing from 1 to 10 carbon atoms such as acrylic acid, methyl acrylic acid, methyl acrylate, ethyl acrylate, α-methylmethacrylate, α-ethylmethacrylate; other acrylic compounds such as chloroacrylic acid, methacrylonitrile, acrylonitrile, N-methyl acrylamide, N,N-decyclohexyl acrylamide, N-phenyl acrylamide, N-α-naphthylacrylamide, N,N-dibenzyl acrylamide, N,N-octadecyl acrylamide, and N,N-dimethyl acrylamide; vinyl keto-compounds such as vinyl ethyl ketone; N-vinyl carbazole, N-vinyl pyrolidone and the like. The preferred polar vinyl monomers, especially for the preparation of homopolymers, are the alkyl esters of acrylic acid and α-alkyl acrylic acids and acrylonitrile. The above listing is, however, only an exemplification of polar vinyl compounds and is not to be construed as limitative of the invention.

By the use of two or more of such polar vinyl monomers, random copolymers or interpolymers may be produced in accordance with this invention as easily as the homopolymers. Monomer mixtures containing a major proportion of acrylonitrile, acrylic acid esters, or methacrylic acid esters either alone or in admixture, in further admixture with other polar vinyl monomers have been found to be particularlry well suited for the present process and are preferred. The relative proportion of polar vinyl monomers in the preparation of copolymers is not however critical, and is dependent primarily upon the desired copolymer. While rates of polymerization of such monomers are not always the same, simple analysis of the copolymer prepared can readily indicate the most desirable molar concentrations of each monomer in a desired polymer.

It is quite surprising to find that the polymerization mechanism involved in the process of this invention is free-radical induced in view of the fact that the polymerization mechanism involved in catalyst compositions comprising an organo aluminum compound and a vanadium halide is generally conceived to be ionic in nature.

The catalyst composition of the present invention contains as essential components an organo aluminum compound and a vanadyl [(V=O)++] derivative of a 1,3-diketone.

The organo aluminum compounds operable as one component of the catalyst system include aluminum trialkyl compounds and alkoxide derivatives thereof which are represented by the general formula $R_{3-n}Al(OR)_n$ wherein $n$ is an integer having a value of from 0 to 2 inclusive, the aluminum trialkyls being represented by the formula when $n$ is zero and the alkoxide derivatives being represented when $n$ has a value of 1 or 2.

The aluminum trialkyl compound can be any member of the class having the general formula $AlR_3$ wherein R is an alkyl radical. It is not necessary that each of the R groups be the same alkyl group since it has been found that the activity of the $AlR_3$ compound is independent of the number of carbon atoms contained in the alkyl groups attached to the aluminum. Because it is easily prepared, triisobutyl aluminum is preferred and is the species most frequently used. It does not, however, provide any appreciable advantage over other members of the generic class of trialkyl aluminum compounds exemplified by triethyl aluminum, triisopropyl aluminum, tri-n-butyl aluminum, tridecyl aluminum, tridodecyl aluminum and the like, and is used in the examples hereinafter solely for the purposes of illustration.

Instead of, or in addition to, trialkyl aluminum compounds, alkyl aluminum alkoxides can be used which are represented by the general formula $R_{3-n}Al(OR)_n$ in which $n$ has a value of either 1 or 2 and each R group is an alkyl radical. As is the case with the trialkyl aluminum compounds, the nature of the alkyl groups of the alkyl aluminum alkoxide compounds is not at all critical. The R groups can be the same or different in any given compound of the generic class and for the purposes of this invention are not dependent on the number of carbon atoms of which they are comprised or on whether they are straight chains or branch chains.

The alkyl aluminum alkoxide compounds are readily prepared from an aluminum trialkyl and a monohydric alcohol by spontaneous reaction at room temperatures according to the following equations:

$$R_3Al + R'OH \rightarrow R_2AlOR' + RH$$
$$R_3Al + 2R'OH \rightarrow RAl(OR')_2 + RH$$

As a practical matter it is not necessary to isolate a particular species of alkyl aluminum alkoxide, since either an $AlR_3$, $R_2AlOR$, or $RAl(OR')_2$ or a mixture of all three or any two species is equally as effective as any species alone.

The vanadyl $[(V=O)^{++}]$ derivatives of the 1,3-diketones useful in this invention as stated above have the general formula

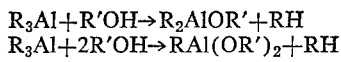

wherein M is $(V=O)^{++}$ and the group represented by R is an alkyl or aryl hydrocarbon group containing up to eight carbon atoms. Preferred among the alkyl groups are the lower alkyl groups containing up to five carbon atoms.

Illustrative of a few of these derivatives which are effectively utilized in the present process are the vanadyl $[(V=O)^{++}]$ derivatives of such diketones as dibenzoyl methane (1,3-diphenyl propane-dione-1,3) and benzoylacetone, as well as vanadyl acetylacetonate. The latter is preferred in the process of this invention. The vanadyl derivatives are conveniently prepared by precipitating $VO(OH)_2$ from a solution of 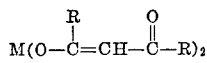 by the addition of an alkali metal hydroxide, dissolving the $VO(OH)_2$ in an alcohol solution of the desired diketone, and separating the solid vanadyl-bis-diketone by filtration.

In the utilization of these catalyst compositions in the practice of the present invention, the metal derivative of the 1,3-diketone component and the organo aluminum component are preferably employed in a mole ratio of from about 1:20 to about 20:1. It is particularly preferred to employ a ratio of catalyst components of from about 1:5 to about 5:1.

The concentration of the catalyst composition with respect to the monomer to be polymerized is not narrowly critical since the composition is active in the catalytic sense regardless of the relative proportion of catalyst to monomer. Of course, the overall polymerization time is dependent upon the concentration of catalyst composition, but this variation is readily adjusted according to the desires of the operator. It has been found, however, that concentrations of from about 5 to about 100 millimoles of the metal derivative of the 1,3-diketone and from about 5 to about 100 millimoles of organo aluminum compounds per mole of monomer to be polymerized provide generally satisfactory polymerization periods with from 5 to 25 millimoles of each component per mole of monomer being preferred.

The process can be operated on a batch, semicontinuous, or continuous basis and can be carried out in the presence of an inert organic medium or in the absence thereof as desired. It has been found, however, that the presence of an organic liquid medium inert to the catalyst and monomer is advantageous. Such inert organic media as benzene, toluene, xylene, n-hexane, heptane, isooctane, cyclohexane, and petroleum ether are but exemplary of the many well known in the art. When such media are employed amounts sufficient to establish an initial concentration preferably of from about 5 to about 500, or more preferably of about 25 to 100 grams of monomer per 100 ml. of medium have been found to be entirely suitable, although the relative amounts of monomer and liquid organic medium are not at all critical.

It is also advantageous to add the catalyst composition to the reaction vessel in the form of a solution in the liquid organic medium when such is employed, and preferably a solution containing the total catalyst composition in a concentration of from about 5 to about 25 millimoles per 100 ml. of solvent. The catalyst concentration insofar as this solution is concerned is, however, not in any way critical.

Temperatures within the range of 0° C. to 100° C. have been found to be entirely satisfactory with even higher temperatures being suitable for the higher boiling polar vinyl monomers and in those circumstances in which greater than atmospheric temperatures, up to about 10 atmospheres, are employed to maintain the reaction system in the liquid state. From a practical standpoint, however, the reaction is pressure independent, and the temperature a matter of mere choice easily made by one skilled in the art. The reaction conditions most preferred are atmospheric pressure and temperatures within the range of about 0° C. to about 25° C.

Isolation of the polymer can be accomplished in the conventional manner by adding a non-solvent for the polymer in an amount sufficient to precipitate the polymer from the reaction mixture, filtering off the precipitated polymer, washing the precipitate with additional quantities of the precipitating solvent and drying the polymer. Further purification of the polymer can be effected by dissolving the polymer in a solvent such as chloroform, acetone or any good solvent for the polymer, filtering the solution and reprecipitation of the polymer by addition of a non-solvent such as alcohol, petroleum ether, and the like.

By way of further illustrating the present invention, the following examples are provided:

EXAMPLE 1

*Preparation of Polyacrylonitrile Using as a Catalyst Vanadyl Acetylacetonate and Diisobutylaluminum Butoxide*

A catalyst was prepared by placing in a 50 milliliter flask using 0.28 gram vanadyl acetylacetonate, 0.20 gram diisobutylaluminum butoxide, 5 cc. of heptane. To the mixture was added 5 cc. (4.0 grams) of acrylonitrile. After standing only 2 hours at room temperature the contents of the reaction flask were a solid mass of polymer. Alcohol was added and the solid polymer separated by filtration. After being washed and dried, the polymer weighed 1.1 grams (28% yield).

EXAMPLE 2

*Preparation of Poly(Methylmethacrylate) Using as a Catalyst Vanadyl Acetylacetonate and Diisobutylaluminum Butoxide*

A catalyst was prepared from 0.28 gram of vanadyl acetylacetonate, 0.20 gram diisobutylaluminum butoxide and 5 cc. heptane. To the catalyst was added 5 cc. methyl methacrylate. Within 2 hours standing at room temperature a solid mass of polymer was obtained. Alcohol was added and the solid polymer separated by filtration. After washing and drying 0.8 gram of polymer was obtained (17% yield).

EXAMPLE 3

*Preparation of Polyacrylonitrile Using as a Catalyst Vanadyl Acetylacetonate and Butylaluminum Diisopropoxide*

The catalyst was prepared as above using 0.28 gram vanadyl acetylacetonate, 0.20 gram butylaluminum diisopropoxide and 5 cc. heptane. To the catalyst was added 5 cc. methyl methacrylate. After standing for 2 hours the reaction mass was treated with alcohol and the solid polymer separated by filtration. The polymer was washed with alcohol and dried. The yield was 1.3 grams (28% yield).

The solid polymers obtained from the polymerization of polar vinyl monomers according to the process of the present invention are suitable for the production of molded and extruded articles, as electrical insulation, and for the manufacture of films, sheeting, and fibers.

Whereas the invention, as illustrated by the foregoing examples, has been described with a certain degree of particularity, that many modifications can be made without departing from the spirit and intended scope of the invention will of course be obvious to those skilled in the art.

What is claimed is:

1. Process for polymerizing a polar vinyl monomer which comprises contacting a polar vinyl monomer under polymerization conditions with a catalyst composition comprising a metal derivative of a 1,3 diketone having the general formula $$M(O-\underset{\underset{R}{|}}{C}=CH-\underset{\underset{}{||}}{\overset{O}{C}}-R)_2$$

wherein M is a vanadyl radical and the groups represented by R are hydrocarbon groups having up to eight carbon atoms and at least one organo aluminum compound having the formula $R_{3-n}Al(OR)_n$ wherein each R is an alkyl group and $n$ is an integer having a value of from 0 to 2.

2. Process for polymerizing a polar vinyl monomer which comprises contacting said polar vinyl monomer under polymerization conditions with a catalyst composition comprising a metal derivative of a 1,3 diketone having the general formula $$M(O-\underset{\underset{R}{|}}{C}=CH-\underset{\underset{}{||}}{\overset{O}{C}}-R)_2$$

wherein M is a vanadyl radical wherein R is an alkyl group having up to five carbon atoms and at least one organo aluminum compound having the formula $$R_{3-n}Al(OR)_n$$

wherein each R is an alkyl group and $n$ is an integer having a value of from 0 to 2, said metal derivative of a 1,3 diketone and said organo aluminum compound each being present in an amount of from about 5 to about 100 millimoles per mole of polar vinyl monomer.

3. The process according to claim 2 in which the polar vinyl monomer is contacted by the catalyst composition in the presence of an inert organic solvent medium.

4. The process according to claim 2 in which the molar ratio of the metal derivative of a 1,3 diketone to the organo aluminum compound is from about 1:5 to about 5:1.

5. The process according to claim 2 in which the polar vinyl monomer has the formula $$H\overset{R}{\underset{|}{C}}=\overset{H}{\underset{|}{C}}-\overset{O}{\underset{||}{C}}OR'$$

wherein R and R' are each selected from the group consisting of hydrogen and an alkyl radical containing from 1 to 10 carbon atoms.

6. Process for polymerizing a polar vinyl monomer which comprises contacting said polar vinyl monomer in the presence of a liquid inert organic medium and at a temperature in the range of about 0° C. to about 100° C. with a metal derivative of a 1,3 diketone having the general formula $$M(O-\underset{\underset{R}{|}}{C}=CH-\underset{\underset{}{||}}{\overset{O}{C}}-R)_2$$

wherein M is a vanadyl radical and wherein R is an alkyl radical having up to five carbon atoms and at least one organo aluminum compound having the formula $R_{3-n}Al(OR)_n$ wherein each R is an alkyl group and $n$ is an integer having a value of from 0 to 2.

7. The process according to claim 2 wherein the polar vinyl monomer is acrylonitrile.

8. The process according to claim 2 wherein the polar vinyl monomer is methyl methacrylate.

9. The process according to claim 2 wherein the polar vinyl monomer is a compound having the formula $$R-\overset{O}{\underset{||}{C}}-O-\overset{H}{\underset{|}{C}}=\overset{H}{\underset{|}{C}}H$$

wherein $$\overset{O}{\underset{||}{\underset{R}{C}}}-O$$

is the residue of a monobasic organic carboxylic acid.

10. The process according to claim 5 in which R of the polar vinyl monomer is hydrogen.

References Cited in the file of this patent

UNITED STATES PATENTS 2,943,063    Eby et al. _____ June 28, 1960

OTHER REFERENCES

Gaylord et al.: "Linear and Stereoregular Addition Polymers," Interscience Publishers, Inc., N.Y. (1959).